Donald W. Dareing
INVENTOR.

Nov. 30, 1965  D. W. DAREING  3,220,279
GEAR TOOTH SYSTEM
Filed Dec. 16, 1963  5 Sheets-Sheet 3

Donald W. Dareing
INVENTOR.

BY *Gary C. Honeycutt*
ATTORNEY

Donald W. Dareing
INVENTOR.

BY *Gary C. Honeycutt*
ATTORNEY

United States Patent Office 3,220,279
Patented Nov. 30, 1965

3,220,279
GEAR TOOTH SYSTEM
Donald W. Dareing, Tulsa, Okla., assignor, by mesne assignments, to Esso Production Research Company, Houston, Tex., a corporation of Delaware
Filed Dec. 16, 1963, Ser. No. 330,747
5 Claims. (Cl. 74—462)

This invention relates to gearing systems. More particularly a gear tooth system is provided in which a plane tooth surface is mated with a novel convex tooth surface.

The fundamental law of gear tooth action requires that the common normal to the tooth profiles at the point of contact must always pass through a fixed point on the line of centers. It is well known that uniform velocity transmission can be achieved only by strict adherence to this principle.

However, a great deal more is required of a commercially successful gear system than the ability to provide uniform velocity transmission. The tooth profile must be capable of being readily and accurately reproduced. The contact surfaces must be readily susceptible to efficient lubrication in order to reduce scuffing. Contact stresses must be minimized in order to reduce pitting. The pressure angle should be small in order to reduce the thrust tending to separate the gear shafts. The gear teeth should be as strong as possible in order to reduce stresses in the material when under load.

The most common gear tooth system in use today, the involute gear, involves the mating of two convex tooth surfaces. When heavily loaded, the useful life of an involute gear system is somewhat limited, since the convex-convex contact causes a concentration of stresses which ultimately leads to pitting and failure. A further disadvantage of mating two convex tooth profiles is the relative difficulty of securing adequate lubrication at high loads. The rubbing or sliding action of the two convex surfaces in the absence of proper lubrication causes severe scuffing.

Cycloidal gears have essentially the same limitations as the involute gears. Additional disadvantages to the cycloidal system are: variable pressure angle, difficult to manufacture accurately, and installation difficulties. Moreover, cycloidal gears are also subject to excessive pitting because of high contact stresses, and severe scuffing due to inadequate lubrication.

Accordingly, it is an object of the present invention to provide a gear system which not only fulfills the necessary conditions for uniform velocity transmission, but which also resists pitting and scuffing to a greater extent than present day involute and cycloidal gears.

The gear tooth system of the present invention comprises a flat or planar tooth mated with a particular convex-profile tooth, which is a significant improvement over the conventional convex-convex contact. Prolonged gear life is obtained as a result.

The contact stresses in the gear tooth system of the present invention are substantially less than is characteristic of the involute or the cycloidal systems. As a result, pitting is reduced. The mating of a flat tooth surface with the convex tooth surface of the present invention offers the further advantage of a lubricating wedge shape which is capable of substantially improved lubrication, whereby scuffing is also materially reduced.

Spur gear systems have appeared in the prior art which reflect various attempts to mate a plane tooth surface with a convex tooth surface. However, the convex tooth profiles of such prior systems have been selected from classical curve forms, e.g., an arc of a circle or an arc of an involute. In fact, no such classical tooth profile is capable of proper, continuous mating with spur gear teeth having plane contact surfaces, as will become apparent from a detailed consideration of the present invention.

Helical gearing, on the other hand, is not subject to the same limitations as spur gearing. A helical gear, each cross-section of which has a straight-line tooth profile, is capable of proper, continuous mating with another helical gear having a cross-sectional tooth profile corresponding to an arc of a circle, or some other classical shape. The principal limitation in mating such gears is the requirement that corresponding cross-sectional contact profiles must satisfy the fundamental law of gear tooth action for at least one angular position of the mated gears.

Figure 1:
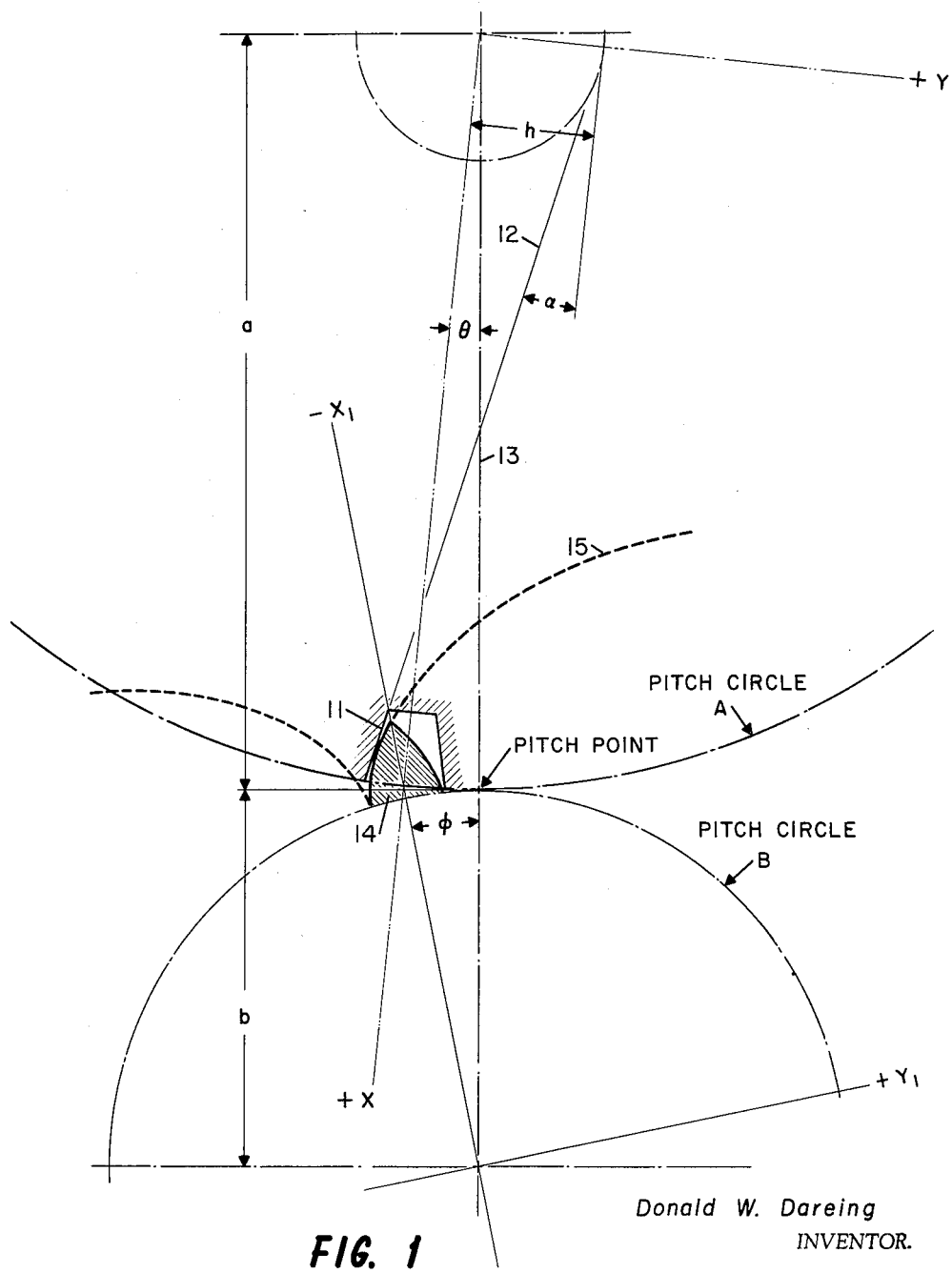
FIGURE 1 shows the reference frames and coordinate systems used to define the family of convex profiles of the invention.

In FIGURE 1, the reference frame of a first spur gear, having flat-sided teeth, is represented by pitch circle A and rectangular coordinates XY. The linear profile of contact surface 11 lies on line 12, which has a negative slope $\alpha$ and a Y-intercept $h$. The reference frame of a second spur gear, to be mated with the first gear, is represented by pitch circle B and rectangular coordinates $X_1Y_1$, lying in the same plane as XY. The gear centers are located at the origin of the respective coordinate systems, and are connected by center line 13.

An initial angular position for the reference frames is selected, such that the X and $X_1$ axes coincide with the center line. Tooth space 11 and tooth 14 are bisected by the X and $X_1$ axes, respectively. As the XY reference frame is rotated clockwise through angle $\theta$, the $X_1Y_1$ reference frame is rotated counterclockwise through angle $\phi$, whereby the pitch circles are engaged in pure rolling contact at the pitch point.

It is an object of the invention to provide tooth 14 with a profile having the exact shape necessary to mate with tooth surface 11 and satisfy the fundamental law of gear tooth action.

Accordingly, the gear tooth profile of the present invention is represented in FIGURE 1 by that segment of dotted curve 15 which bounds the contact surface of tooth 14. Curve 15 is defined by the following parametric equations:

(1)
$$X_1 = X \cos\left(\frac{b}{a}+1\right)\phi + Y \sin\left(\frac{b}{a}+1\right)\phi - d \cos\phi$$

(2)
$$Y_1 = -\sin\left(\frac{b}{a}+1\right)\phi + Y \cos\left(\frac{b}{a}+1\right)\phi + d \sin\phi$$

where:

$$X = \cos\alpha \cos(\beta+\alpha)\sqrt{h^2+a^2-2ah\sin\left(\frac{b}{a}\phi\right)}$$

$$Y = \sin\alpha \cos(\beta+\alpha)\sqrt{h^2+a^2-2ah\sin\left(\frac{b}{a}\phi\right)} + h$$

$$\beta = \arctan\left(\frac{h - a\sin\frac{b}{a}\phi}{a\cos\frac{b}{a}\phi}\right)$$

$a$ = radius of pitch circle of gear with flat tooth surface
$b$ = radius of pitch circle of mating gear
$d = (a+b)$ or center distance
$\phi$ = angular position of gear with convex tooth surface
$h$ = Y-intercept of extended flat-tooth profile
$\alpha$ = slope of flat-tooth profile in XY coordinate system.

Curve 15 may also be defined as the curve traced in the $X_1Y_1$ reference frame by the orthographic projection of the pitch point on the planar tooth surface 11, as the respective reference frames rotate about their centers in a single plane, in opposite directions, with an angular velocity inversely proportional to the radii of the pitch circles.

Figure 2:
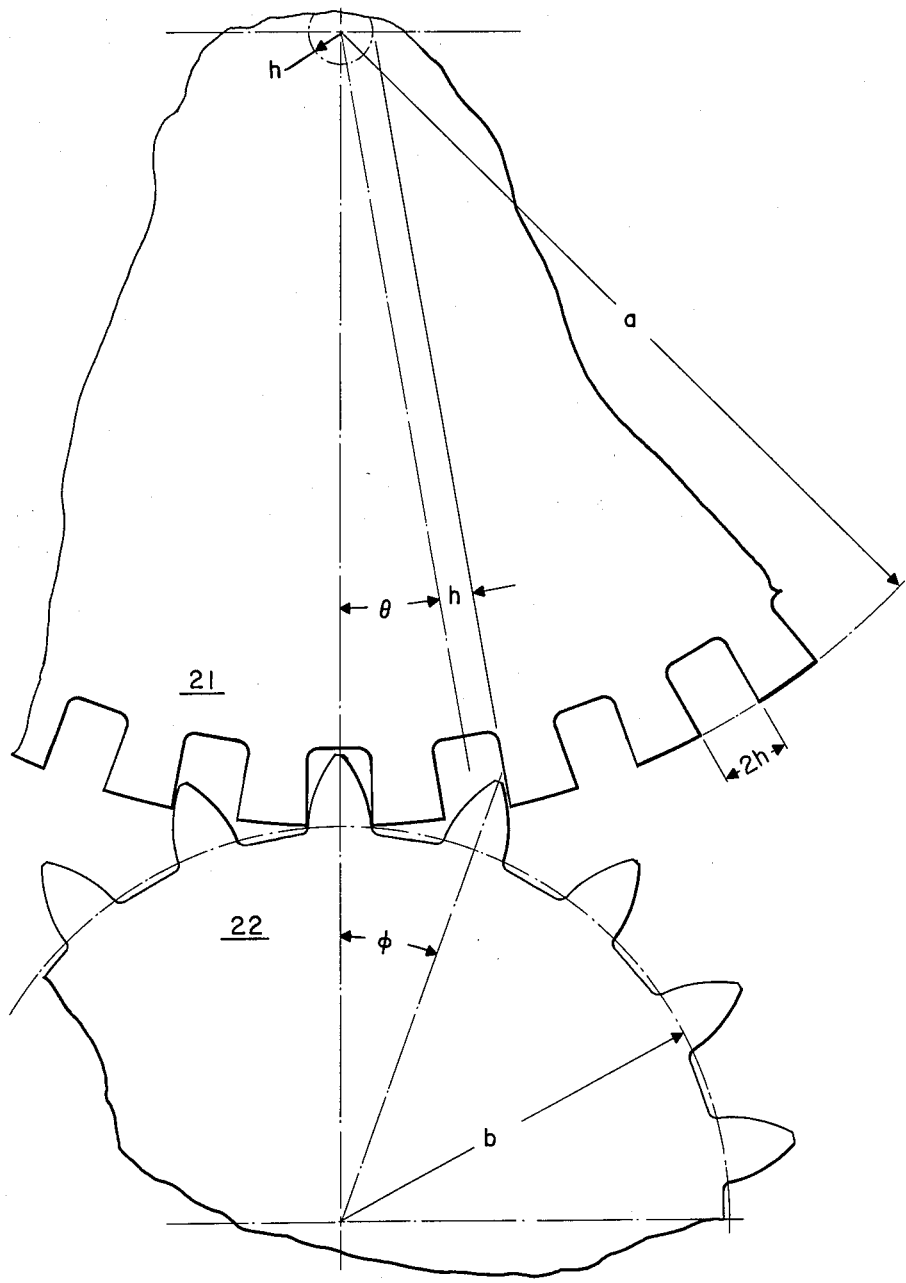
FIGURES 2-8 illustrate various examples of spur gear profiles, mated in accordance with the invention.

FIGURE 2 is a right sectional view of a system of spur gears having a velocity ratio of 2, and illustrating a tooth space having parallel sides, i.e., the angle $\alpha$ (FIGURE 1) is 0 and the value $h$ is ½ the tooth space width. Gear 21 has 36 teeth and gear 22 has 18 teeth.

Figure 3:
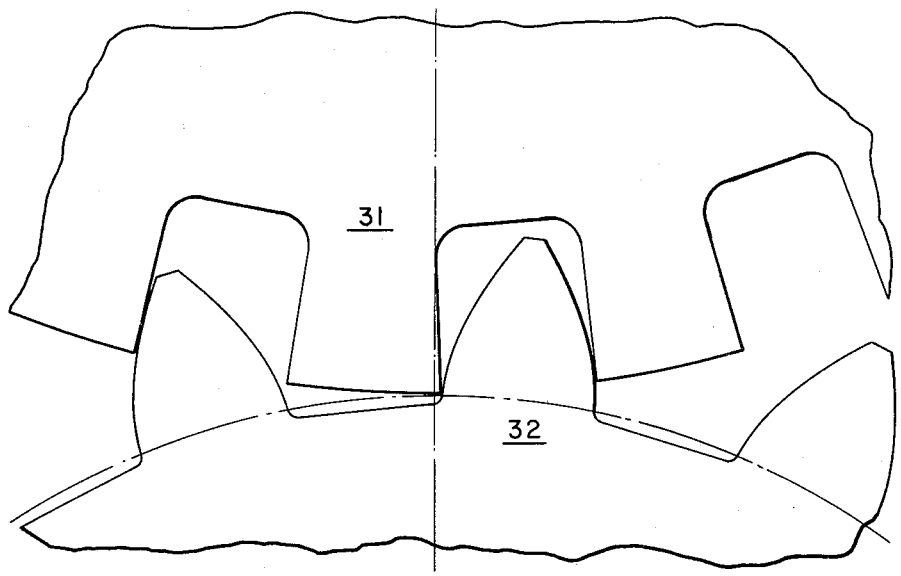

FIGURE 3 shows a spur gear system having a velocity ratio of 3:2, wherein the flat-sided tooth space is slightly wider at the pitch circle than at the root circle. That is, the value $h$ equals ¼ inch and the angle $\alpha$ is 0.04 radian. Gear 31 has 21 teeth and gear 32 has 14 teeth.

Figure 4:
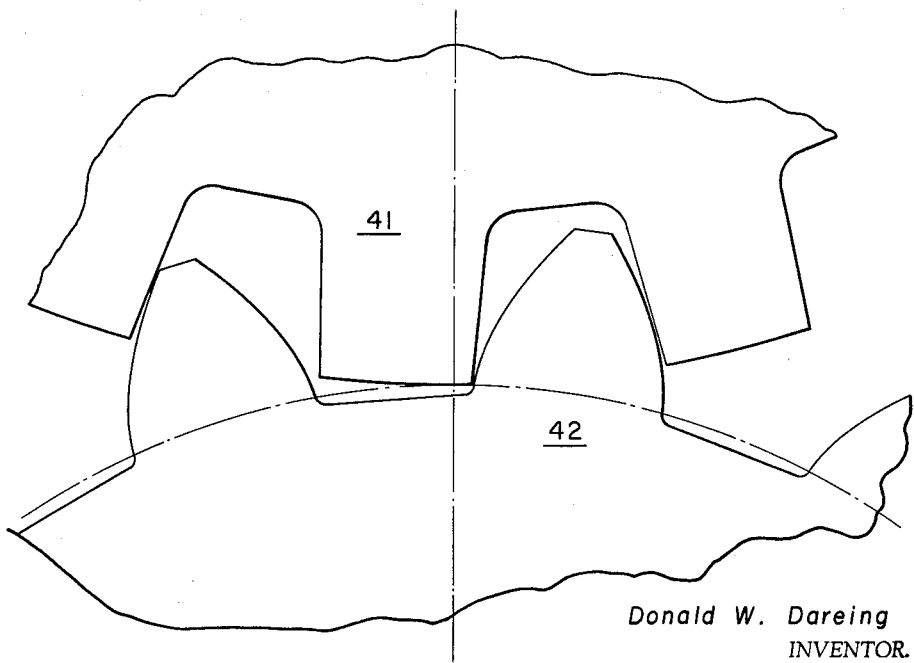

FIGURE 4 illustrates a spur system having a velocity ratio of 3:2 wherein the sides of the flat tooth space diverge sharply outward. The value $h$ is one inch and the angle $\alpha$ is minus 0.19 radian. Gear 41 has 21 teeth and gear 42 has 14 teeth.

Figure 5:
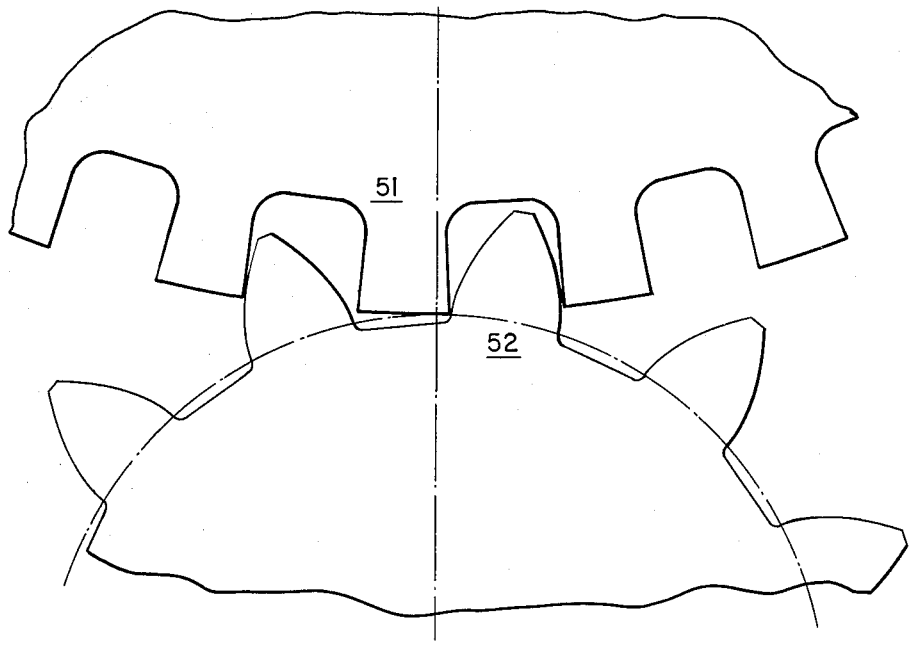

FIGURE 5 shows a spur gear system having a velocity ratio of 3:1 wherein the flat-sided tooth space is slightly wider at the pitch circle than at the root circle. The value $h$ is ¼ inch and the angle $\alpha$ is +0.02 radian. Gear 51 has 36 teeth and gear 52 has 12 teeth.

Figure 6:
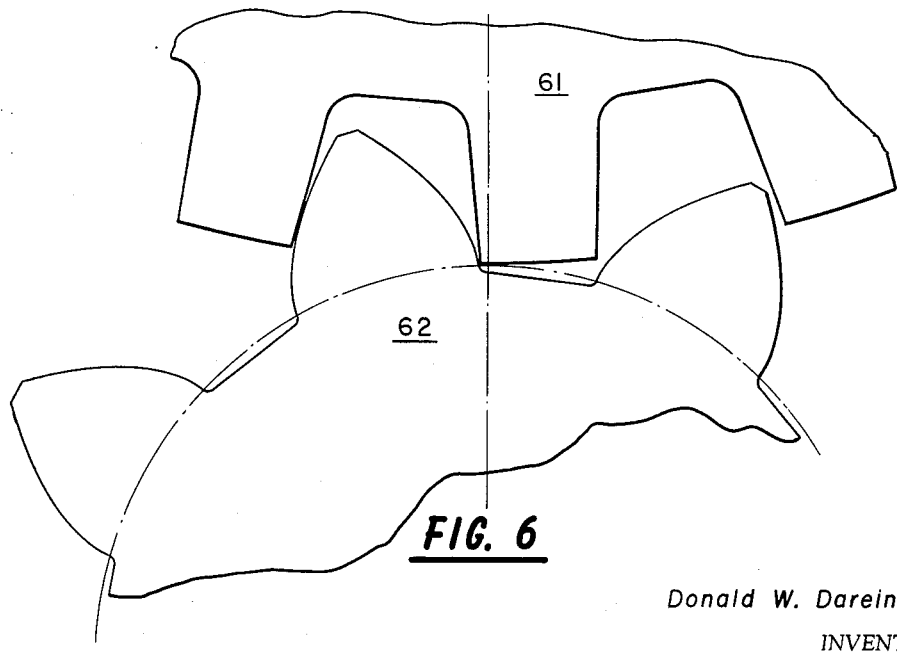

FIGURE 6 illustrates a spur system having a velocity ratio of 3:1 wherein the sides of the flat tooth space diverge sharply outward. The value $h$ is 1 inch and the angle $\alpha$ —0.19 radian. Gear 61 has 24 teeth and gear 62 has 8 teeth.

Figure 7:
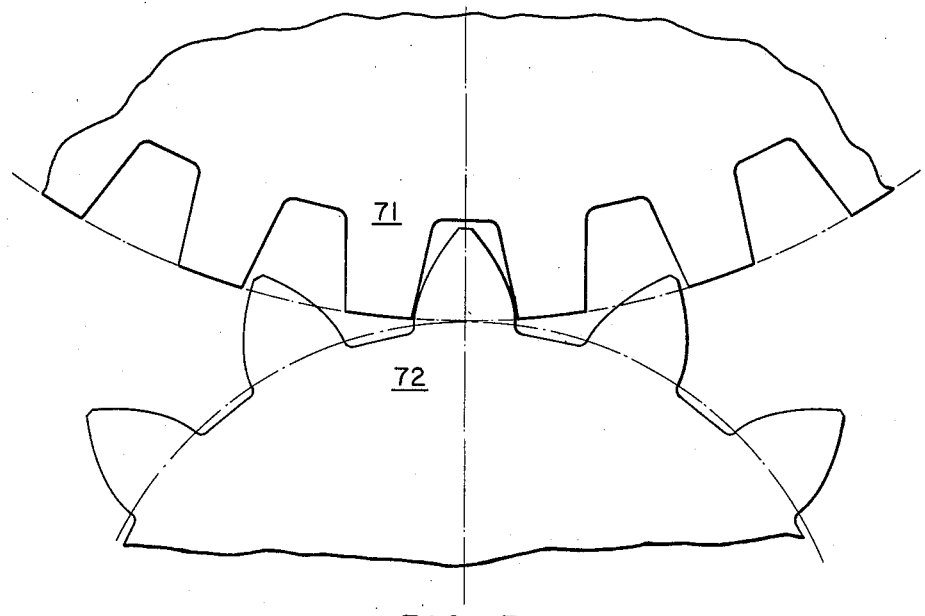

FIGURE 7 shows a spur gear system having a velocity ratio of 2:1, wherein the sides of the flat tooth space diverge sharply outward. The value $h$ is one inch and the angle $\alpha$ is —0.23 radian. Gear 71 has 28 teeth and gear 72 has 14 teeth.

It will be apparent from a consideration of the above examples that by varying the value $h$ and the angles $\alpha$ an infinite number of additional examples are available for each desired velocity ratio.

Although the detailed description of the invention, including the various examples, is limited to spur gear systems, it will be apparent to those skilled in the art that the profile of the invention is also applicable to helical gear teeth as well.

It will be noted in the embodiments of FIGURES 2, 3 and 5 that the thickness of the flat-sided teeth is greater at the pitch circle than at the root circle. In the embodiments of FIGURES 4, 6 and 7, the reverse is true; that is, the flat-sided teeth have a greater width at the root circle than at the pitch circle. From the standpoint of tooth strength the embodiments of FIGURES 4, 6 and 7 are therefore preferred. It is a characteristic of these preferred embodiments that the linear profile, when extended, intersects the center line of the corresponding tooth space to form a substantial angle therewith, at a point between the gear center and the tooth space. That is, the flat sides of the tooth space converge inward at a sharper angle than radial lines drawn from the same points on the pitch circle.

A further advantage of these preferred embodiments lies in the fact that the point of initial contact between a driving tooth and a driven tooth falls precisely at the pitch point. Accordingly, the pressure contact between teeth comes entirely during the arc of recess rather than during the arc of approach, thereby providing an exceptionally smooth and quiet operation.

It is well known that the teeth of an involute rack have rectilinear contact profiles, since the radius of the rack base circle is infinite. It is not possible, however, to satisfy the fundamental law of gear tooth action by mating an involute tooth profile with a rectilinear tooth profile of a gear having a finite radius. Such mating is possible only with the novel convex profile of the present invention.

The fact that an involute rack has a rectilinear contact profile is of great importance in the manufacture of involute gears, because it makes possible the generation of involute teeth by means of a straight-sided cutting tool. Similarly, it will be apparent to those skilled in the art that the novel convex profile of the present invention can also be generated by means of a straight-sided cutting tool. Moreover, it is apparent that the mating gear, since it has straight sides, can also be generated with a straight-sided cutting tool. Thus the industrial mass-production of the present gear system is quite feasible.

Figure 8:
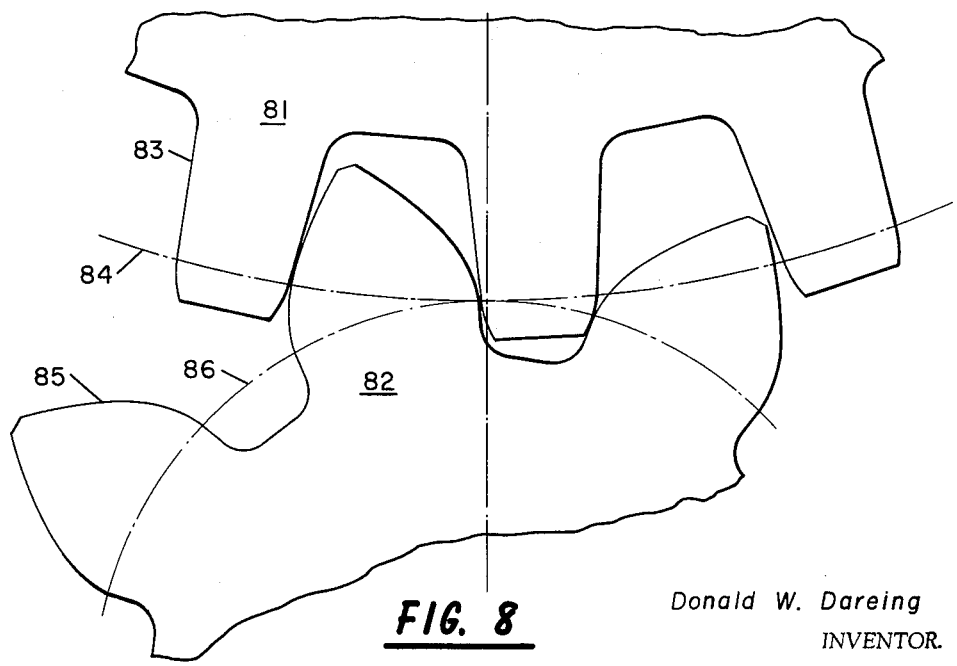

FIGURE 8 illustrates a modification of the spur gear system of FIGURE 6. A greater contact ratio is obtained in this embodiment by providing each tooth with an extended contact surface. For example, that portion of profile 83 which lies inside pitch circle 84 is identical to the flat profile of gear 61 (FIGURE 6). That portion of profile 85 which lies outside pitch circle 86 is identical to the tooth profile of gear 62. The extended portions of profiles 83 and 85 are cycloidal curves, mated in accordance with the fundamental law of gear tooth action.

Composite profiles, such as illustrated by FIGURE 8, may also be obtained by extending the contact surfaces of any of the remaining embodiments, whenever it is desired to increase the contact ratio of a particular gear system.

While various embodiments of the invention have been specifically disclosed, other variations within the scope of the appended claims will readily occur to those skilled in the art. For a discussion of general gear technology, and a definition of terms associated therewith, the reader is referred to chapter 4 of Ham, Crane and Rogers, "Mechanics of Machinery," 4th ed., McGraw-Hill Book Co., Inc. (1958).

What is claimed is:

1. A system of gearing comprising first and second mated spur gears, the teeth of said first gear having plane contact surfaces, and the teeth of the second gear having a convex profile capable of engagement with the teeth of said first gear only at the orthographic projection of the pitch point on said plane surfaces.

2. A spur gear comprising a body portion and a plurality of teeth, the contact surfaces of said teeth having a profile defined by the following (1)
$$X_1 = X \cos\left(\frac{b}{a}+1\right)\phi + Y \sin\left(\frac{b}{a}+1\right)\phi - d \cos\phi$$

(2)
$$Y_1 = -X \sin\left(\frac{b}{a}+1\right)\phi + Y \cos\left(\frac{b}{a}+1\right)\phi + d \sin\phi$$

where:

$$X = \cos\alpha \cos(\beta+\alpha)\sqrt{h^2+a^2-2ah\sin\left(\frac{b}{a}\phi\right)}$$

$$Y = \sin\alpha \cos(\beta+\alpha)\sqrt{h^2+a^2-2ah\sin\left(\frac{b}{a}\phi\right)} + h$$

$$\beta = \arctan\left(\frac{h - a\sin\frac{b}{a}\phi}{a\cos\frac{b}{a}\phi}\right)$$

and $a$ = radius of pitch circle of gear with flat tooth surface
$b$ = radius of pitch circle of mating gear
$d = (a+b)$, or center distance
$\phi$ = angular position of gear with convex tooth surface
$h$ = Y-intercept of extended flat-tooth profile
$\alpha$ = slope of flat-tooth profile in XY coordinate system.

3. A system of gearing comprising first and second mated spur gears, the teeth of said first gear having plane contact surfaces, and the teeth of the second gear having a profile defined at least in part by the curve traced in the reference frame of the second gear by the orthographic projection of the pitch point on the contact surfaces of tooth space of the first gear as the reference frames of the two gears rotate about their respective centers in a single plane, in opposite directions, with an angular velocity inversely proportional to the radii of the pitch circles.

4. A system of gearing comprising first and second mated circular spur gears, the teeth of said first gear having a greater width at the root circle than at the pitch circle and having rectilinear contact profiles; the teeth of the second gear having contact surface profiles generated in the reference frame of the second gear by the orthographic projection of the pitch point on the contact surfaces of the first gear, as the reference frames of the respective gears rotate about their centers in opposite directions, with an angular velocity inversely proportional to the radii of the pitch circles.

5. A system of gearing comprising first and second mated spur gears, the teeth of said first gear having composite profiles composed essentially of plane contact surfaces inside the pitch circle and cycloidal contact surfaces outside the pitch circle; and the teeth of the second gear having a composite profile composed essentially of cycloidal contact surfaces inside the pitch circle, the remaining contact surfaces of the second gear having a profile generated in the reference frame of the second gear by the orthographic projection of the pitch point on the plane contact surfaces of the first gear, as the reference frames of the two gears are rotated in opposite directions about their respective centers in a single plane, with an angular velocity inversely proportional to the radii of the pitch circles.

References Cited by the Examiner

UNITED STATES PATENTS

| | | | |
|---|---|---|---|
| 1,313,035 | 8/1919 | Williams | 74—462 |
| 1,425,144 | 8/1922 | Schmick | 74—462 |

FOREIGN PATENTS

| | | |
|---|---|---|
| 165,369 | 10/1904 | Germany. |

DON A. WAITE, *Primary Examiner.*